March 18, 1930.  B. M. SHAUB  1,751,366
DRAWING INSTRUMENT
Filed Sept. 13, 1926   2 Sheets-Sheet 1
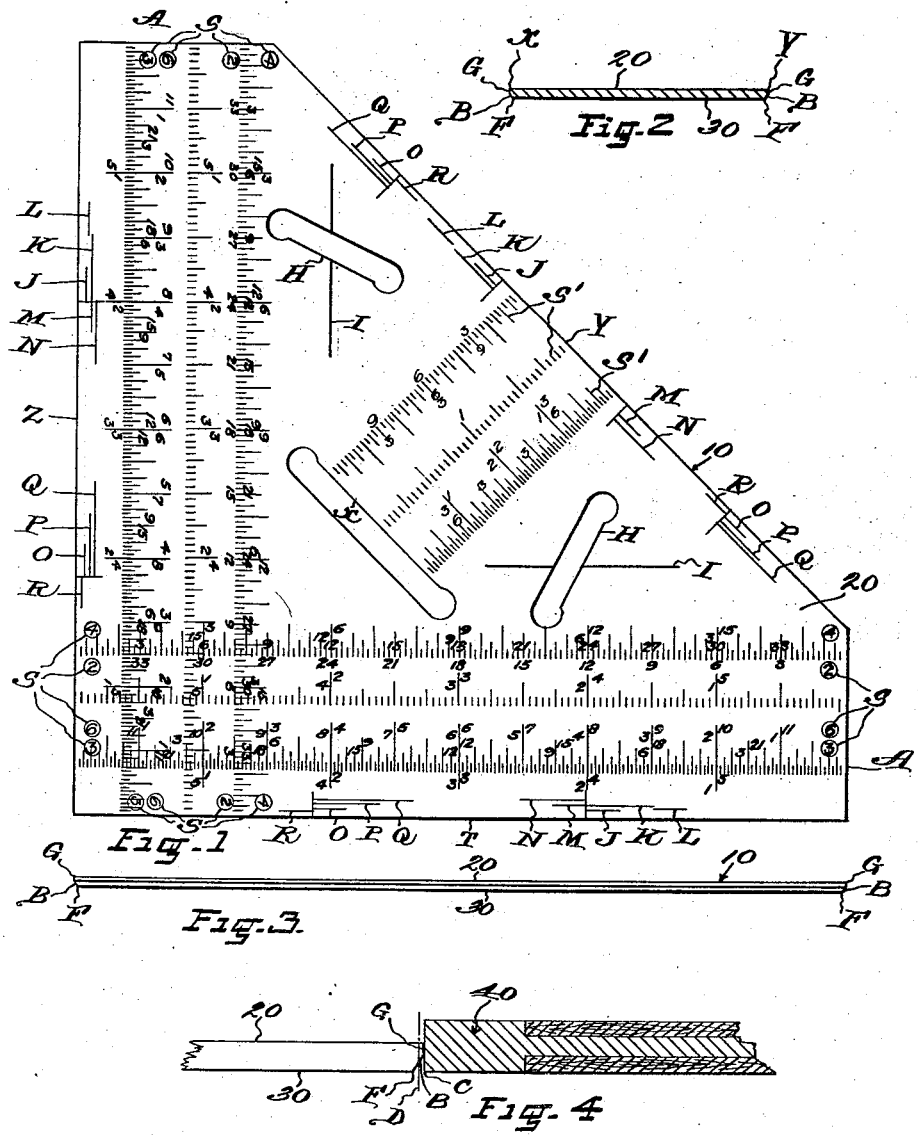

March 18, 1930.  B. M. SHAUB  1,751,366

DRAWING INSTRUMENT

Filed Sept. 13, 1926   2 Sheets-Sheet 2

Inventor
Benj. M. Shaub

Witnesses
Clyde S. Rehmeyer
C. W. Rose

Patented Mar. 18, 1930

1,751,366

UNITED STATES PATENT OFFICE

BENJAMIN M. SHAUB, OF ITHACA, NEW YORK

DRAWING INSTRUMENT

Application filed September 13, 1926. Serial No. 135,126.

This invention relates to certain improvements in drawing instruments; and the nature and objects of the invention will be readily recognized and understood by those skilled in the arts involved in the light of the following explanation and detailed description of the accompanying drawings illustrating what I at present consider to be the preferred embodiments or mechanical expressions of my invention from among various other forms, arrangements, combinations and constructions of which the invention is capable within the spirit and scope thereof.

The invention is directed particularly to and deals with the so-called "straight edge" types of drawing or drafting instruments characterized by a flat plate or strip of material formed of the required thickness and shape to present its edges at the desired angles to each other, so as to provide guide edges along which lines can be drawn on a surface upon which the instrument is laid and maintained in the desired position. Generally these "straight edge" types of instrument are employed in mechanical or similar character of drawing in which the lines are laid off or drawn accurately to scale, scale markings being provided on the instrument, and experience has established the fact that considerable inaccuracies result in a drawing due to the errors arising from the thickness of the pencil point or variations in the fineness thereof in drawing a line by guiding the pencil point along and against an edge of the instrument.

The present invention has as one of the main objects the reduction to a negligible degree, of the foregoing inherent difficulty with the "straight edge" type of drawing instrument, by so designing the edges thereof and arranging the scale markings on the instrument with respect to the guide edges, as to compensate for the pencil point thickness or fineness variations and permit of drawing therewith without material error or inaccuracy.

A universally employed and necessary form of the above mentioned "straight edge" type of drawing instrument is the well known "triangle" in the form of a flat triangular plate having the edges thereof at the desired angles to each other; and a further characteristic of the invention resides in the design and arrangement of a series of scale markings on a "triangle", in such a relation with respect to the edges thereof, that the instrument can be efficiently employed for accurately locating vertical, horizontal, or inclined lines on a drawing through the medium of the instrument edges and the scale markings.

A further object of the invention is to provide a drawing instrument of the "straight-edge" type in the form of a "triangle" having truncated ends which in cooperation with scales marked on the instrument, enable its use to accurately locate and draw horizontal and vertical lines in a drawing from a given line or point on the drawing, or the surface upon which the drawing is to be formed.

Another object of the invention is the provision of a drawing instrument of the "straight edge" type formed with auxiliary guide or ruling edges disposed in a certain relation to the main guide or ruling edges of the instrument, for the purpose of drawing guide lines for lettering a drawing, or for locating lines thereon.

A further object of the invention is to provide for locating and drawing section lines on cross section areas of a drawing with a drawing instrument of the "straight-edge" type in an accurate and uniformly spaced manner, by forming section line scale markings on the instrument in such a relation to the guide or ruling edges thereof as to enable the use of the instrument to locate and uniformly space and draw the desired section lining.

A still further object of the invention is to provide a design, construction and arrangement of "straight-edge" type of drawing or drafting instrument which combines and presents in a single instrument the characteristics of a "scale", a "triangle", and a "section liner" and "lettering guide", which instrument is of simple form capable of efficient and accurate use for the several purposes mentioned, as well as other purposes and uses which may arise in drawing work, and which is capable of ready manufacture without special machinery, at a relatively low cost.

Another characteristic of the invention resides in the provision of a "straight-edge" type of drawing instrument formed of transparent material having the scale markings formed on the under side and visible in proper position from and through the upper side of the instrument when placed in position on a drawing, and in the arrangement and relative location of the scale markings with respect to the guide or ruling edges of the instrument so as to secure accurate results from their use and minimum possibility of error in their reading in drawing and measuring a line therefrom.

With the foregoing general objects, and certain other objects and results in view which will be readily apparent from the following explanation, the invention consists in certain novel features in construction and in combinations and arrangements of elements forming the invention, as will be more fully and particularly referred to and specified hereinafter.

Referring to the accompanying drawings:

Fig. 1 is a top plan view of a drawing instrument of the invention in the form of a truncated triangle having the scale markings formed and arranged thereon in accordance with the principles of the invention.

Fig. 2, is a vertical transverse section through the instrument between the edges $x$ and $y$, thereof, to show the beveled form of the edges $x$ and $y$.

Fig. 3, is a view in end or edge elevation of the instrument showing the beveled formation of the guide edges.

Fig. 4, is a detail view, more or less diagrammatical, and showing the location of the zero or datum line of the scale with respect to the beveled guide edge, and showing the instrument in operative relation with a T-square, a portion only of the T-square being shown in vertical section.

Figures 5, 6:
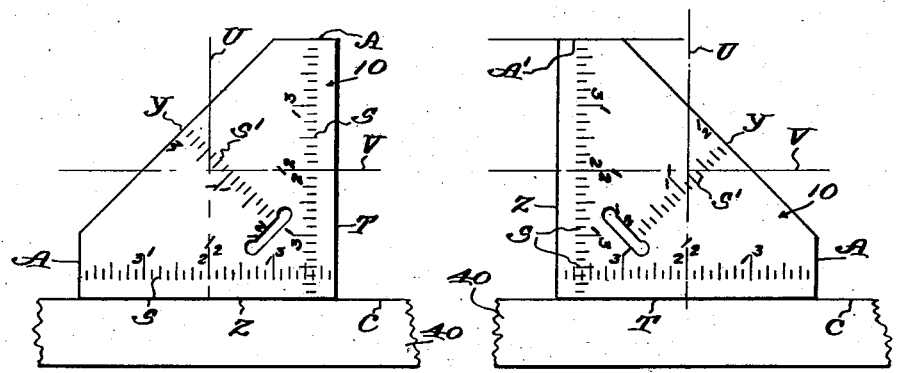
Fig. 5, is a view more or less diagrammatical showing the use of the instrument with a T-square for locating a vertical line to the right (or to the left) of a vertical center or base line of a drawing.
Fig. 6, is a view more or less diagrammatical, showing a use of the instrument for locating a horizontal line above (or below) a horizontal base or center line of a drawing.

A drawing or drafting instrument of the "straight-edge" type in the form of a triangle embodying and incorporating the invention, is presented in the accompanying drawing purely by way of example and not of limitation, for the purpose of illustrating and explaining the principles and various features of the invention, but it is to be understood, as will be clear from the following description, that the invention in all features is not restricted to the triangular form shown but is of general application to drafting or drawing instruments of the "straight-edge" and other types. While the triangle shown is of the 45° type, there is no limitation intended thereby, for obviously triangles of the 30°-60° and other combinations of angles may be employed within the range and principles of the invention, as will be understood by those familiar with drawing instruments.

In Figs. 1 to 4, of the drawings a drawing instrument 10 of the "straight-edge" type in the form of a 45° triangle is shown constructed and arranged in accordance with the present invention. The triangle 10 is formed of a flat triangular plate of transparent material, such as celluloid or the other materials well known in the art and used for the purpose, and presenting the guiding or ruling straight edges T and Z along the legs of the triangle and the edge Y along the hypotenuse of the triangle. Following the principles of the invention the triangle 10 is truncated, that is the ends or apexes at the points of intersection of the hypotenuse edge Y with the leg edges T and Z, are cut off to form the straight edges A, as will be clear by reference to Fig. 1 of the drawings in particular. Along each leg of the triangle 10, a series of spaced, parallel scales S, are formed spaced inwardly from and parallel with the leg edges T and Z, and extending from the truncated ends A of the triangle to the opposite leg edges T and Z, respectively, with the scales S intersecting, as shown in Fig. 1. The scales S are formed in any well known manner on the under side or surface 30 of the triangle 10 in such a manner and so arranged as to be visible and read from the upper side or surface 20 with triangle 10 laid in operative position upon, and surface 30 and scales S coincident with, the surface on which the drawing is to be prepared. The scales S are numbered and read from zero at their opposite ends inwardly from the respective triangle edges adjacent thereto, and each scale S is preferably given a number, as shown by the numbers (4), (2), (6), and (3) in Fig. 1, to indicate the number of inches, for example, on the scale to represent a standard foot, although obviously other measuring standards may be employed, such as the metric system. The parallel scales of each series S are preferably contrastingly colored to permit of their being more readily distinguishing and read in using the instrument, and as an example it is proposed to alternately color the scales of each series red and black, though not limited to these particular colors.

A feature of the invention provides for compensating for errors in a drawing due to inaccuracies in lines drawn by a pencil or the like along a guiding or ruling edge T, Y, Z, or A, of the triangle 10, and this is accomplished in the present embodiment by forming the guiding edges with a downwardly and inwardly inclined beveled surface B, from a point below the upper surface 20 to and joining the lower surface 30 at F, as clearly shown by Figs. 2, 3, and 4 of the accompanying drawings. The bevel B thus forms the edges of the triangle undercut with an upper edge bearing surface G for abutting the edge C of a T-square 40, or other instrument with which the triangle may be employed, as shown by Fig. 4. According to this feature of the invention, the scales S are arranged with their zero points located in a vertical line or plane midway between the edges F and G of the edges of the triangle, respectively adjacent the opposite ends of the scales, as indicated by the zero or datum line or plane D in Fig. 4 of the drawings, in connection with the scale end markings as shown in Fig. 1. When the triangle 10 is used as the straight edge to locate a line, the pencil point is positioned by the bevel face to draw a line coincident with the zero or datum line of the scale. In using the T-square 40, the triangle 10 is employed to locate the T-square so that a line drawn along the edge of the square will coincide with the zero on the triangle scale in that position. In this manner, a line can be drawn to coincide with the zero of the scale whether the triangle or the T-square is used to guide the pencil in drawing a line. The bevel straight edges further function and operate to limit and restrict errors due to the variations of the pencil point fineness or thickness.

A series of scales S' are formed in a similar manner to scales S, on the under surface of the triangle 10 from a central portion of the hypotenuse edge Y of the triangle 10, extending inwardly therefrom at right angles thereto, to a ruling or guiding edge X formed parallel with edge Y by an elongated slot or opening through the body of the triangle, for a purpose appearing hereinafter. The ruling or guiding straight-edge X is formed with a bevel under face B, similar to edge Y, and the scales S' are arranged to read from zero at their opposite ends adjacent edges X and Y, respectively, with their zero or datum lines disposed in a vertical plane midway of the bevels B of edges X and Y, in a manner and for the purpose explained in connection with scales S and triangle edges A, T, and Z.

At opposite sides of the scales S', and between these scales and the scales S at opposite sides thereof, a line I is formed on the under surface 30 of triangle 10 and parallel to the triangle leg edge respectively adjacent thereto, that is one of the lines I parallel to edge T and the other thereof parallel to edge Z, as shown in Fig. 1 of the drawings. Intersecting and extending across each line I, is an elongated slot or opening forming the straight edge H disposed at a predetermined angle or slope with respect thereto, in the present example at a 2:1 slope with the line I, and these sloping or inclined guide edges are employed for forming or drawing slope guide lines for lettering, in order to give the desired slope to lettering placed on a drawing.

The triangle 10 is further designed for use in forming section lining on a drawing, by the provision adjacent to the edge of the triangle guide or ruling edges T, Y, and Z, on the under surface 30 of the triangle, and parallel therewith, of the parallel lines O, P, and Q, spaced different distances apart and from the triangle edge with which they are respectively adjacent and parallel. In the present example the lines O, P, and Q, extend at one end from a vertical line and at their opposite ends terminate different distances from the common vertical line, although not so limited, so as to be more readily distinguished in use, while a single line R parallel to the triangle edge extends in the opposite direction from lines O, P, and Q, and slightly closer to the adjacent triangle edge than the line O of each series. A set of the section lining guide lines O, P, Q, and R, are formed along and parallel to each of the leg edges T and Z, respectively, of the triangle 10, while a set of these lines O, P, Q, and R, are formed adjacent the hypotenuse edge Y at opposite sides of the series of scales S' extending from this edge, as shown in Fig. 1 of the drawings, although not so limited. The operation and use of the lines O, P, Q, and R, will be described and explained hereinafter.

Figures 9, 10:
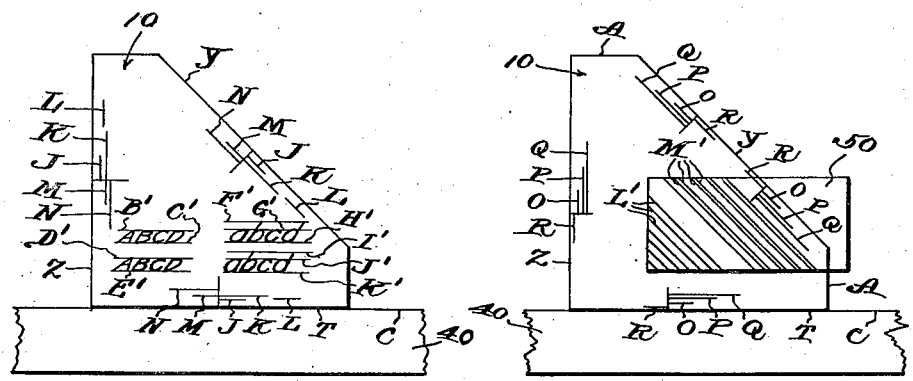
Fig. 9, is a more or less diagrammatical view of the instrument in use to locate and draw lettering guide lines on a drawing.
Fig. 10, is a view, more or less diagrammatic, of the instrument in use as a "section liner" for locating and drawing section lines on section areas of a drawing.

For the purpose of locating and drawing lettering guide lines on a drawing, a series of lines J, K, L, M, and N are formed on the under side or surface 30 of the triangle, adjacent and parallel to each guide or lettering edge T, Y, and Z, thereof, respectively, and in this instance each series is formed with the lines J and K extending from one side of, and the lines M and N extending from the opposite side, of a common vertical line, while the line L is disposed beyond the outer end of line K but between this line and the line J, all as clearly shown in Fig. 1 of the drawings in connection with Fig. 9, and to be explained hereafter.

With the drawing instrument 10, in the form of a triangle, constructed, and having the scale and line arrangements thereon for cooperation therewith, as above described, referring now to Fig. 5 of the drawings, when it is desired to locate a line at a distance of, for example, one inch from a vertical base or center line U of a drawing, and to the right, the triangle is placed on the drawing with leg edge Z against edge C of a T-square 40 and edge T vertically disposed and to the right of the base line U. Then by moving the triangle until the base line U is coincident with the one inch mark of a scale S parallel to leg edge Z, reading from the zero line at edge T, a line is drawn along leg edge T which is the line desired located at one inch to the right of and parallel with the base line. To locate the line to the left of base line U, the triangle is turned with leg T against the T-square 40 and the scale S parallel to edge T used to locate the edge Z at the desired distance, and the line desired is then drawn along edge Z. In both cases, the errors due to variations in pencil point fineness are reduced or limited by the bevel structure of the triangle edges in the relation with the zero or datum lines of the scales S, and the lines drawn caused to coincide therewith, as previously referred to.

When it is desired to locate and draw a line above a base or center line V disposed horizontally, the triangle 10 is placed on the drawing with its edge T against the T-square 40, as shown by Fig. 6, and the T-square and triangle are then moved upwardly or downwardly until the base line V is coincident with the proper marking on scale S which is parallel to edge Z, that is a vertically disposed scale, so as to locate the truncated edge A of the triangle at the required distance above the base line V. A line can then be drawn along edge A at the desired distance above the base line V, and if edge A is not of sufficient length, the line can be completed by raising the T-square to the line already drawn and continuing the same by using T-square edge C, as will be readily understood. A line can be located and drawn at a required distance below the horizontal base line V in a similar manner. The lines so located and drawn are accurately placed due to the beveled edge construction and errors are reduced and limited in the resulting drawing. By the beveled edge of the triangle in the case of the line below the base line, for example, the edge of the T-square causes a line drawn therealong to coincide with the zero of the scale, and thus accurately locates the drawn line.

Figures 7, 8:
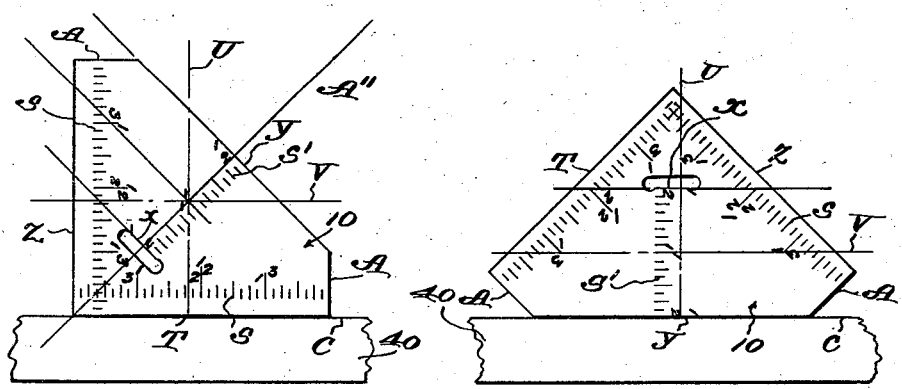
Fig. 7, illustrates more or less diagrammatically, the use of the instrument of the invention to locate lines normal to a 45° line of a drawing.
Fig. 8, is a more or less diagrammatical view showing the use of the instrument to locate lines above and below a base or center line, particularly when the lines to be located are in proximity to an edge of the paper on which the drawing is being formed.

In Fig. 7 of the drawings, the triangle 10 of the invention is shown as employed to locate and draw lines normal to a forty-five (45) degree line A″. The triangle 10 is placed with edge T against T-square 40, and with the line A″ parallel with and along the scale S′ between guide edge X and triangle edge Y, by measuring along scale S′ to locate edge Y at the desired point, a line can then be drawn along Y normal to the line A″, as indicated in Fig. 7. Similarly, if desired or found expedient, the ruling edge X can be used to locate and draw lines normal to the line A″. In the same manner lines can be located and drawn in the other quadrants by changing the position of the triangle 10 to locate the hypotenuse edge Y in the desired quadrant, as will be clear from Fig. 7.

Scales S′ and the guide or ruling edges X and Y can be employed to locate lines above and below a horizontal center or base line V, in a manner shown by Fig. 8 of the accompanying drawings. The triangle 10 is placed with edge Y abutting T-square 40, and is moved upwardly or downwardly until the base line V is at the proper marking of scale S′ to locate edge X at the desired distance from the base line. After locating edge X, a line is then drawn therealong which will be at the desired location above base line V. In the event that the line desired is longer than edge X, the T-square 40 can be employed to continue and complete the same, in the usual manner understood in the art. A line can be located at a desired distance below base or center line V, in a manner similar to that described above, by changing the position of triangle 10, or by locating edge Y or the T-square at the required distance and then drawing the line. The edge X and scale S′ are of particular utility and convenience when the lines to be located and drawn are near or in proximity to the upper or lower edges of the paper or other surface on which the drawing is to be prepared.

The foregoing uses and applications of the triangle 10 in the accurate location of lines on a drawing are merely illustrative of some of the purposes of the instrument of the invention, and it will be obvious that the instrument may be employed in a large variety of other ways for other purposes in the location and formation of lines. With triangles of other angle combinations than that of the example shown, the uses will be varied, and as with triangle 10, these instruments of the invention can be operated to meet the different conditions encountered in the preparation of various drawings and the accurate location and forming of the lines from the instrument scales in association and cooperation with the error compensating guiding or ruling edges.

The use of the lines J, K, L, M, and N for locating and drawing lettering guide lines is illustrated by Fig. 9 of the drawings. The lines M and N are employed for drawing guide lines for upper case letters in lettering a drawing, in the following manner. A line B' is located on the drawing and drawn along the edge C of T-square 40. The triangle, in the present example, is placed with edge T against the T-square and is moved therewith until the line M is coincident with the drawn line B' when another line C' is drawn along the edge T of the triangle or edge C of the T-square located by the triangle edge T. The line C' will then be properly spaced from guide line B', due to spacing of line M from triangle edge T. The triangle 10 and T-square are then moved downwardly until line N is coincident with drawn line C', and a line D' is then drawn along edge C of the triangle, giving the proper spacing between the lines of lettering. Line E', is then drawn by placing line M coincident with line D', in the same manner as line C' was located and drawn. The above operations are repeated until the desired number of lettering guide lines are formed.

The series of lines J, K, and L, are employed for locating and drawing guide lines for lower case lettering, and the operation is similar to that in using lines M and N. A line F' is drawn and then triangle line J is placed in coincidence with drawn line F', and line G' is located and drawn. Triangle line K is then placed coincident with drawn line G' and line H' is located and drawn. To secure the proper spacing between lines of lower case lettering, triangle line L is placed coincident with drawn line H' and the line I' located and drawn, the lettering guide lines J' and K' then being located and drawn in a manner similar to that described with reference to lines G' and H'.

Preferably, all of the lettering guide lines in the horizontal position are drawn along the edge of the T-square, and the bevel edge of the triangle properly locates the T-square edge for such lines.

After the lettering guide lines above described are located and drawn on the drawing, the slope guide lines for the letters can be located and drawn by means of line I and edge H of the triangle shown in Fig. 1 and described hereinbefore. The triangle is placed with a line I of the triangle coincident with a lower lettering guide line, such as line C' or H' of Fig. 9, and a line drawn along edge H across the lettering guide lines which will be at the desired slope for the lettering. This is repeated along the lettering guide lines at intervals to provide the lettering slope guide lines between which the letters are formed.

The triangle 10 through the medium of the series of parallel lines O, P, Q, and R, is capable of operation and use as a "section liner" for drawing cross section lines on section areas of a drawing, and this use is disclosed in Fig. 10 of the accompanying drawings. An area 50 of a drawing is diagrammatically indicated in Fig. 10, which is to be section lined. The triangle 10 is placed with the edge Y across the lower left hand corner of area 50, with the edge T against T-square edge C, and a line L' is drawn along edge Y across the area. The triangle is then moved to the right along the edge C of T-square 40 until triangle line O, parallel with edge Y, is coincident with the line L', when another line L' is drawn along edge Y. This operation is repeated, coinciding triangle line O with the last drawn line L', until the area is covered. A series of accurately spaced section lines L' repeated over the cross section area, and the difficulties in unmeasured section lining with unequal spacing between lines is eliminated, while the time required to section line an area is materially reduced. When a different spacing between the section lines is required, the triangle lines P, or Q, are employed instead of line O. To secure section lining to indicate a particular material, such for example as steel, the lines O and R are used alternately to produce the section lines M' shown in Fig. 10. The series of section line markings O, P, Q, and R on the triangle 10, parallel to the guide edges T and Z at the legs of the triangle are employed in the same manner as explained in connection with the lines O, P, Q, and R, parallel to the hypotenuse edge Y of triangle 10.

Thus, the invention provides in a single "straight-edge" type of drawing instrument, a "triangle", "section-liner", and "lettering guide", as well as providing for the reduction and limitation of errors in laying off and drawing lines of a drawing accurately to scale. The instrument is simple in construction and readily operated and used by unskilled draftsmen, such as drafting students. The accuracy of a drawing and the speed at which it can be prepared are materially increased by the use of these instruments of the invention, and where of the "triangle" type, a series thereof of different angle combinations will increase and widen the range of their usefulness in preparing various types and characters of drawings. With the invention, by fixing one line on the instrument coincident with a line on the drawing, that is, a center line, for example, the other lines can be accurately located therefrom in all cases, and by the bevel edge construction the variation in the location of lines due to variation in the thickness of a pencil point in use, is reduced.

Attention is here directed to the fact that the term "straight-edge" is employed herein in a broad generic sense, as ruling or guiding edge of a drawing instrument, and is to be so interpreted in connection with the invention and the present description and appended claims.

It is also evident that various changes, modifications, variations and substitutions might be resorted to without departing from the spirit and scope of my invention, and hence I do not wish to limit myself to the exact and specific disclosures hereof.

Desiring to protect my invention in the broadest manner legally possible, what I claim is:

1. A drawing instrument embodying a truncated triangle having its under edges beveled, there being a scale parallel to an edge of the triangle extending between two opposite edges, said scale having its zero line located in a vertical plane midway of the bevel at the respective adjacent edge.

2. A drawing instrument embodying a truncated triangle with a scale formed thereon normal to two parallel edges and numbered from zero at each edge, the said parallel edges undercut and the zero lines of the scale located midway of said undercut, respectively.

3. A drawing instrument embodying a triangle, there being a slot formed in the triangle spaced inwardly from the hypotenuse edge thereof to provide a guide edge parallel with the hypotenuse, there also being a scale formed on the triangle and extending between said slot edge and the hypotenuse edge and transversely disposed with respect to such edges.

4. A drawing instrument embodying a truncated triangle having the under edges thereof beveled inwardly, there being scales on the triangle parallel to the leg edges thereof, respectively, and extending between each truncated edge and the opposite leg edge respectively, said scales numbered from zero at each edge but with the zero line located in a vertical plane midway of the bevel of the adjacent edge, respectively.

5. A drawing instrument embodying a flat plate member having at least two guide edges at right angles to each other, with a scale on the member parallel to one of said guide edges and extending at one end to the adjacent guide edge, the adjacent guide edge undercut and the zero line of the scale located in a plane normal to the plate and substantially midway of the undercut of said adjacent edge.

6. A drawing instrument embodying a transparent member having an undercut guide edge, the said member having a series of lines formed on the under surface thereof parallel to said guide edge and spaced inwardly predetermined distances from a plane normal to the member and midway of the undercut edge, respectively, for locating said guide edge in forming a series of spaced parallel lines on a drawing.

Signed at Philadelphia, county of Philadelphia, State of Pennsylvania, this 28 day of August, 1926.

BENJAMIN M. SHAUB.